United States Patent
White et al.

(10) Patent No.: US 8,804,708 B1
(45) Date of Patent: Aug. 12, 2014

(54) METHODS AND APPARATUS FOR IMPLEMENTING ACCESS CONTROL AT A NETWORK SWITCH

(71) Applicant: Juniper Networks, Inc., Sunnyvale, CA (US)

(72) Inventors: Joseph White, San Jose, CA (US); Ronak Shah, Sunnyvale, CA (US); Simon Gordon, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 105 days.

(21) Appl. No.: 13/723,344

(22) Filed: Dec. 21, 2012

(51) Int. Cl.
 *H04L 12/50* (2006.01)
 *H04L 12/28* (2006.01)
 *H04L 12/56* (2006.01)

(52) U.S. Cl.
 CPC .................................. *H04L 45/745* (2013.01)
 USPC .......................................... 370/360; 370/397

(58) Field of Classification Search
 None
 See application file for complete search history.

(56) References Cited

U.S. PATENT DOCUMENTS

| | | | | |
|---|---|---|---|---|
| 8,108,454 B2* | 1/2012 | Snively et al. | ................. | 709/200 |
| 8,559,335 B2* | 10/2013 | Berman | ........................ | 370/254 |
| 8,687,649 B2* | 4/2014 | Armstrong et al. | ........... | 370/466 |
| 2009/0252181 A1* | 10/2009 | Desanti | ......................... | 370/474 |
| 2012/0195188 A1* | 8/2012 | Zhang | ........................... | 370/221 |

* cited by examiner

*Primary Examiner* — Hong Cho
(74) *Attorney, Agent, or Firm* — Cooley LLP (57) ABSTRACT

A switch device is configured to receive a data unit from a virtual port from a first set of virtual ports. The switch device is configured to associate an identifier of each virtual port from the first set of virtual ports with an identifier of a first access group that is associated with an access set. The switch device is configured to prohibit the data unit from being sent to a remaining virtual port from the first set of virtual ports if the data unit is addressed to that virtual port. The switch device is configured to otherwise allow the data unit to be sent to a virtual port from a second set of virtual ports associated with a second access group when the second access group is associated with the access set. The second set of virtual ports is mutually exclusive from the first set of virtual ports.

20 Claims, 5 Drawing Sheets

| Access Set Table 300 | | | |
|---|---|---|---|
| Virtual Port ID 310 | Access Group ID 320 | Access Group Characteristic 330 | Access Set ID 340 |
| 152 | 150 | Exclusive | 1 |
| 154 | 150 | Exclusive | 1 |
| 156 | 150 | Exclusive | 1 |
| 162 | 160 | Exclusive | 1, 2 |
| 164 | 160 | Exclusive | 1, 2 |
| 166 | 160 | Exclusive | 1, 2 |
| 172 | 170 | Exclusive | 1, 3 |
| 174 | 170 | Exclusive | 1, 3 |
| 182 | 180 | Exclusive | 2 |
| 192 | 190 | Inclusive | 3 |
| 194 | 190 | Inclusive | 3 |

Receive, at a switch device and from a first virtual port from a first set of virtual ports, a first data unit, the first data unit having a destination identifier associated with a second virtual port from the first set of virtual ports.
502

↓

Prohibit the first data unit from being sent to the second virtual port from the first set of virtual ports in response to each virtual port from the first set of virtual ports being associated with a first access group, the first access group being associated with an access set.
504

↓

Receive at the switch device and from the first virtual port from the first set of virtual ports, a second data unit, the second data unit having a destination identifier associated with a virtual port from a second set of virtual ports associated with a second access group, the second set of virtual ports is mutually exclusive from the first set of virtual ports.
506

↓

Send the data unit to the virtual port from the second set of virtual ports when the second access group is associated with the access set.
508

FIG. 5

METHODS AND APPARATUS FOR IMPLEMENTING ACCESS CONTROL AT A NETWORK SWITCH

BACKGROUND

Embodiments described herein relate generally to network switches, and, in particular, to implementing access control at switching devices in a network.

Some known networks (e.g., Fibre Channel over Ethernet (FCoE) networks) use Virtual Node (VN) Port to VN Port (VN2VN) technology to implement specific deployments for some dedicated purposes (e.g., functioning as a Storage Area Network (SAN)). Such known networks typically implement a common access control policy where a set of devices may access another set of devices, while a device within each set of devices may or may not be allowed to access the remaining devices within the same set of devices depending on the details of the implementation. The VN2VN protocol, however, does not provide any mechanism to implement zoning or access control configuration to control access between network devices.

On the other hand, some known zoning and access control methods exist for various types of networks (e.g., FCoE networks). Those zoning and access control methods typically use a central-controlling device such as a Fibre Channel Forwarder (FCF) in a Fibre Channel (FC) fabric. Using such a central-controlling device, however, is typically complex, error prone, difficult to scale, and incompatible with the VN2VN protocol.

Accordingly, a need exists for methods and apparatus that can implement the access control policy in a VN2VN-enabled network.

SUMMARY

A switch device is configured to receive a data unit from a virtual port from a first set of virtual ports. The switch device is configured to associate an identifier of each virtual port from the first set of virtual ports with an identifier of a first access group that is associated with an access set. The switch device is configured to prohibit the data unit from being sent to a remaining virtual port from the first set of virtual ports if the data unit is addressed to that virtual port. The switch device is configured to otherwise allow the data unit to be sent to a virtual port from a second set of virtual ports associated with a second access group when the second access group is associated with the access set. The second set of virtual ports is mutually exclusive from the first set of virtual ports.

DETAILED DESCRIPTION

In some embodiments, a switch device is configured to receive a data unit from a virtual port from a first set of virtual ports. In some instances, the switch device can be an edge device of a multi-stage switch. In some instances, each virtual port from the first set of virtual ports can be a Fibre Channel over Ethernet (FCoE) Virtual Node (VN) port implemented in a VN port to VN port (VN2VN) FCoE configuration.

The switch device is configured to associate an identifier of each virtual port from the first set of virtual ports with an identifier of a first access group, which is associated with an access set. In some instances, the identifier of a virtual port from the first set of virtual ports can include an identifier associated with a physical port of a peripheral processing device associated with that virtual port, and a Virtual Local Area Network (VLAN) identifier associated with that virtual port. In such instances, the switch device is configured to be operatively coupled to the physical port of the peripheral processing device associated with that virtual port.

If the data unit is addressed to a remaining virtual port from the first set of virtual ports, the switch device is configured to prohibit the data unit from being sent to the remaining virtual port from the first set of virtual ports when the first access group is restricted. If the data unit is otherwise addressed to a virtual port from a second set of virtual ports associated with a second access group, the switch device is configured to allow the data unit to be sent to that virtual port from the second set of virtual ports when the second access group is associated with the access set. The second set of virtual ports is mutually exclusive from the first set of virtual ports. In some instances, both of the first access group and the second access group can be associated with a Layer 2 (L2) domain.

In some embodiments, an apparatus includes a switch module and an access set table. The switch module is implemented in a memory or a processing device, and configured to be operatively coupled to a set of virtual ports. The access set table is accessible to the switch module. The access set table is configured to associate an identifier of each virtual port from the set of virtual ports with an identifier of an access group from a set of access groups. The access set table is also configured to associate an identifier of each access group from the set of access groups with an identifier of at least one access set. The set of virtual ports includes a first virtual port that is associated with a first access group, which is from the set of access groups and associated with an access set from the at least one access set. The set of virtual ports also includes a second virtual port associated with a second access group from the set of access groups.

The switch module is configured to implement a set of filter rules based on the access set table. Specifically, the switch module is configured to prohibit a first data unit received from the first virtual port from being sent to a third virtual port from the set of virtual ports based on a first filter rule that is from the set of filter rules and indicating that the third virtual port is associated with the first access group. The switch module is also configured to allow a second data unit received from the first virtual port to be sent to the second virtual port based on a second filter rule that is from the set of filter rules and indicating that the second access group is associated with the access set from the at least one access set.

As used herein, a module can be, for example, an assembly of hardware or software modules (stored in memory and/or executing in hardware), or a set of operatively-coupled electrical components, and can include, for example, a memory, a processor, electrical traces, optical connectors, software (stored in memory and/or executing in hardware) and/or the like. As used herein, the singular foams "a," "an" and "the" include plural referents unless the context clearly dictates otherwise. Thus, for example, the term "a switch device" is intended to mean a single device or a set of devices with similar functionalities associated with switching data.

Figure 1:
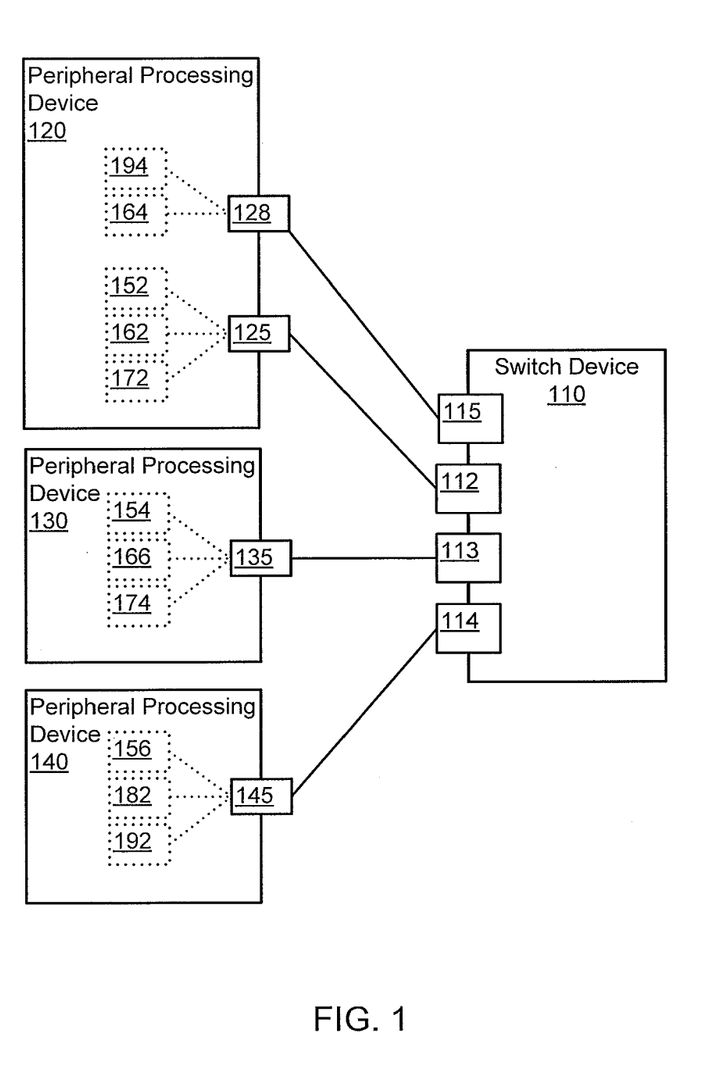
FIG. 1 is a schematic illustration of a switch device configured to switch data for a set of peripheral processing devices, according to an embodiment.

FIG. 1 is a schematic illustration of a switch device 110 configured to switch data for a set of peripheral processing devices 120, 130, 140, according to an embodiment. The switch device 110 is operatively coupled to each of the peripheral processing devices 120, 130, 140. Particularly, the switch device 110 can be operatively coupled to a peripheral processing device (e.g., the peripheral processing device 120) using one or multiple connections between port(s) of the switch device 110 and port(s) of the peripheral processing device. As shown in FIG. 1, ports 115, 112 of the switch device 110 are coupled to ports 128, 125 of the peripheral processing device 120, respectively; a port 113 of the switch device 110 is coupled to a port 135 of the peripheral processing device 130; a port 114 of the switch device 110 is coupled to a port 145 of the peripheral processing device 140. Although not shown in FIG. 1, in some embodiments, the switch device 110 can be operatively coupled to more or less peripheral processing devices with more or less connections via their ports than those shown in FIG. 1.

The switch device 110 can be any device configured to perform data switching for the coupled peripheral processing devices (e.g., the peripheral processing devices 120, 130, 140). Such a switch device can be any combination of hardware and/or software (stored in memory and/or executing in hardware) that is configured to collectively perform the data switching function. In some embodiments, the switch device 110 can be a switching device configured to operate according to Ethernet and/or FCoE network protocols. The switch device 110 can be, for example, an Ethernet switch, an FCoE transit switch, etc. In such embodiments, the switch device 110 can be configured to transmit data between the peripheral processing devices 120, 130, 140 based at least in part on the Ethernet and/or FCoE network protocols.

Figure 4:
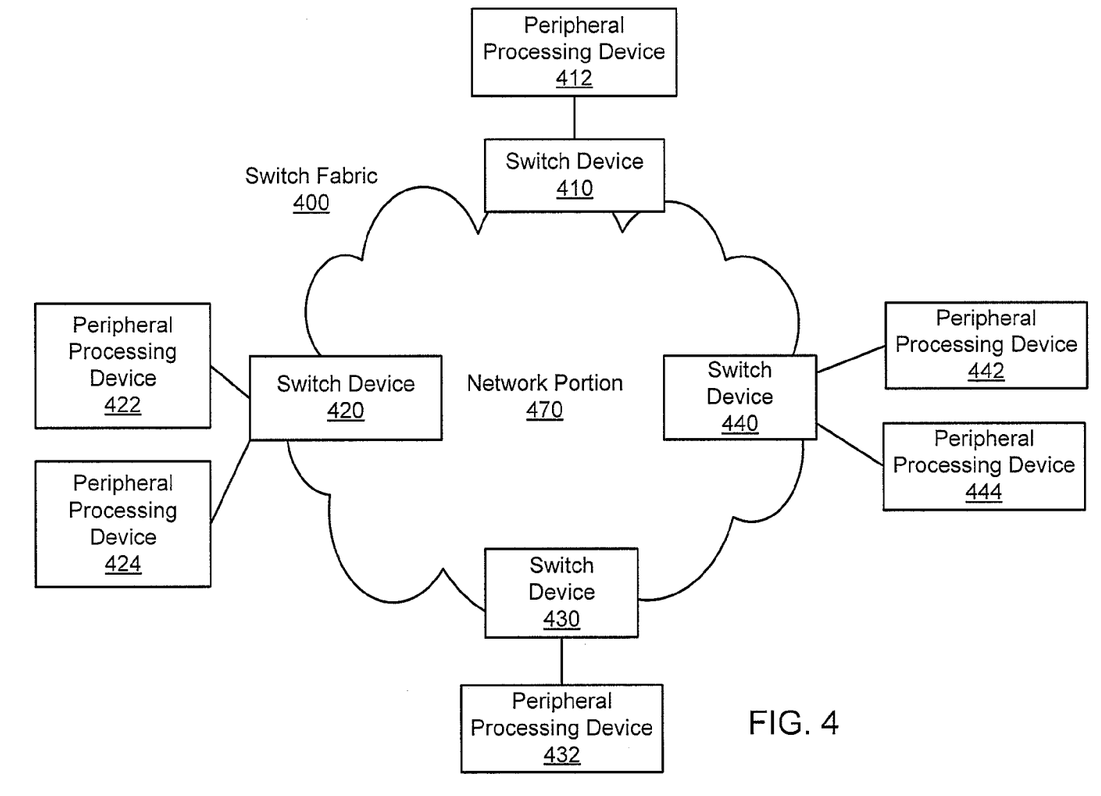
FIG. 4 is a schematic illustration of a switch fabric configured to switch data for a set of peripheral processing devices, according to an embodiment.

In some uses, as shown and further described with respect to FIG. 4, the switch device 110 can be included in a network or a portion of a network that includes multiple switching devices. For example, the switch device can be an edge device of a multi-stage switch fabric. In some uses, the switch device 110 can be included in, for example, a mixed Ethernet and Fibre Channel portion of a network that includes multiple switch devices. In such uses, the switch device 110 can be configured to cooperate with other switching devices in the network to switch data for peripheral processing devices (including the peripheral processing devices 120, 130, 140) operatively coupled to the network.

The ports 112, 113, 114 and 115 of the switch device 110 can be any device, element or component of the switch device 110 that is configured to transmit data between the switch device 110 and the connected peripheral processing device. As shown in FIG. 1, each port 112, 113, 114 or 115 is uniquely coupled to a port of the peripheral processing devices 120, 130, 140. In some embodiments, a port of the switch device 110 can be physically coupled to a port of the peripheral processing device 120, 130 or 140. In other embodiments, a port of the switch device 110 can be operatively coupled to one or more ports of the peripheral processing device 120, 130, 140. For example, a port of the switch device 110 can include a wireless transceiver that is configured to communicate wirelessly with one or multiple wireless transceivers of one or multiple peripheral processing devices, such that the switch device 110 can transmit data wirelessly with the one or multiple peripheral processing devices.

In some embodiments, each port 112-115 can be a physical Ethernet port configured to exchange data with the connected peripheral processing devices 120, 130, 140 based on the Ethernet and/or FCoE network protocols. That is, the ports 112-115 can send FCoE data units (e.g., FCoE data packets, FCoE data frames, FCoE data cells, etc.) to and/or receive FCoE data units from the connected peripheral processing devices 120, 130, 140. In some embodiments, although not shown in FIG. 1, each port 112-115 can be associated with and/or located at an Ethernet Network Interface Card (NIC) included in the switch device 110.

The peripheral processing devices 120, 130, 140 can be any device that can be operatively coupled to and communicate with the switch device 110. Similarly stated, each peripheral processing device 120, 130, 140 can be any combination of hardware and/or software (stored in memory and/or executing in hardware) capable of transmitting data to and/or receiving data from the switch device 110. In some embodiments, the peripheral processing devices 120, 130, 140 can be, for example, a server device, storage device, compute device, gateway, workstation, and/or the like.

Particularly, in some embodiments, the switch device 110 and the peripheral processing devices operatively (e.g., the peripheral processing devices 120, 130, 140) coupled to the switch device 110 can operate as a Storage Area Network (SAN), such as a parallel Network File System (pNFS). Specifically, a set of the peripheral processing devices (e.g., the peripheral processing devices 120, 130) can be server devices and another set of the peripheral processing devices (e.g., the peripheral processing device 140) can be storage devices. The server devices can access data stored in the storage devices. A server device may or may not access another server device depending on an access control policy. Similarly, a storage device may or may not access another storage device according to the access control policy. Such an access control mechanism can be implemented at the switch device 110, as described in detail with respect to FIGS. 2 and 3.

In some embodiments, the peripheral processing device 120, 130, 140 can perform one or more computing tasks, such as one or more data storage, Software-as-a-Service (SAS), web service, content request, or other computing tasks. In some embodiments, one or more of the peripheral processing devices 120, 130, 140 can be a Fibre Channel-based device. In such embodiments, the peripheral processing devices 120, 130, 140 can be operatively coupled to other Fibre Channel-based devices (e.g., other peripheral processing devices, Fibre-Channel switches, Fibre Channel fabric, SAN, etc.) via the switch device 110.

In some embodiments, as described above, the peripheral processing devices 120, 130, 140 can be operatively coupled to and in communication with the switch device via any suitable connection such as, for example, an optical connection (e.g., an optical cable and optical connectors), an electrical connection (e.g., an electrical cable and electrical connectors), a wireless connection (e.g., wireless transceivers), and/or the like. Similarly stated, each of the ports 128, 125, 135 and 145 can provide a communication interface through which the peripheral processing device 120, 130 or 140 can be operatively coupled to the switch device 110. As such, the peripheral processing devices 120, 130, 140 can send data units (e.g., Ethernet data units, FCoE data units, data packets, data frames, data cells, etc.) to and receive data units from the switch device 110. In some embodiments, each connection between the peripheral processing devices 120, 130, 140 and the switch device 110 is a direct link. In other embodiments, although not shown in FIG. 1, the peripheral processing devices 120, 130, 140 can be operatively coupled to the switch device 110 via one or more intermediate modules or devices. In some embodiments, any combination of the peripheral processing devices 120, 130, 140 can be physically located within the same physical chassis as one another and/or the switch device 110. In other embodiments, each of the peripheral processing devices 120, 130, 140 and/or the switch device 110 can be located within a different chassis.

Each port 128, 125, 135, 145 can be a physical port capable of sending and/or receiving Ethernet and/or FCoE data units. In some embodiments, one or more of the ports 128, 125, 135, 145 can be a physical Ethernet port associated with and/or located at a physical line card (not shown in FIG. 1) of the corresponding peripheral processing, such as an Ethernet NIC. In some embodiments, one or more of the ports 128, 125, 135, 145 can be a Fibre Channel N_port (also known as node port) that is used with Fibre Channel Point-to-Poing (FC-P2P) and/or Fibre Channel Switch Fabric (FC-SW) protocols. In such embodiments, one or more of the ports 112-115 of the switch device 110 can be, for example, a Fibre Channel F_port (also known as a fabric port) that is connected to the N_port point-to-point. As such, each port 128, 125, 135, 145 of the peripheral processing devices 120, 130, 140 can communicate with the corresponding port 112-115 of the switch device 110 using a point-to-point connection.

In some embodiments, a physical port (e.g., the port 128, 125, 135, 145) of a peripheral processing device (e.g., the peripheral processing device 120, 130, 140) can be associated with one or more virtual ports instantiated at that peripheral processing device. Specifically, as further described below, the one or more virtual ports associated with the physical port can be engaged in communication sessions via the physical port. As shown in FIG. 1, the port 128 is associated with virtual ports 194 and 164 that are instantiated at the peripheral processing device 120; the port 125 is associated with virtual ports 152, 162 and 172 that are instantiated at the peripheral processing device 120; the port 135 is associated with virtual ports 154, 166 and 174 that are instantiated at the peripheral processing device 130; the port 145 is associated with virtual ports 156, 182 and 192 that are instantiated at the peripheral processing device 140. In some alternate embodiments, a virtual port is uniquely associated with a physical port. That is, a virtual port is not associated with more than one physical port at the same time. In some embodiments, a virtual port can be, for example, a FCoE Virtual Node (VN) port. Furthermore, in some embodiments, a virtual port can be a FCoE VN port implemented in a VN2VN FCoE configuration.

A virtual port instantiated at a peripheral processing device can be associated with a virtual communication entity instantiated at that peripheral processing device. Such a virtual port can be used as a virtual end node to define a virtual link that connects the virtual communication entity associated with the virtual port and another virtual communication entity instantiated at another device (e.g., another peripheral processing device). In some embodiments, a virtual port can be included in a Virtual Local Area Network (VLAN). For example, the virtual ports 152, 154 and 156 are included in a first VLAN; the virtual ports 162, 164, 174 and 182 are included in a second VLAN; the virtual ports 194, 172, 166 and 192 are included in a third VLAN. In some embodiments, virtual ports associated with the same VLAN are not associated with a common physical port. For example, the virtual ports 194 and 164 are associated with a common physical port but are not included in the same VLAN; the virtual ports 194, 172, 166 and 102 are included in the same VLAN and are not associated with a common physical port.

In some embodiments, each virtual port is associated with a unique identifier. In some embodiments, the identifier of a virtual port included in a VLAN can be associated with (e.g., determined based on, a combination of etc.) an identifier of the physical port associated with the virtual port, and an identifier of the VLAN. As discussed above, because virtual ports included in the same VLAN are not associated with a common physical port, each combination of the identifier of a physical port and the identifier of a VLAN is unique for a virtual port. As a result, the identifier of each virtual port is unique across all virtual ports. From the example described above, the identifier of the virtual port 194 is associated with (e.g., determined based on, a combination of, etc.) an identifier of the physical port 128 and an identifier of the third VLAN; the identifier of the virtual port 164 is associated with the identifier of the physical port 128 and an identifier of the second VLAN; etc. In some embodiments, a combination of a physical port (e.g., the port 128) and a virtual port associated with the physical port (e.g., the virtual port 194) can be referred to as a logical port.

Each virtual port instantiated at the peripheral processing devices 120, 130, 140 can be engaged, as a virtual end node, in communication sessions via the physical port associated with that virtual port. Thus, two virtual ports instantiated at the peripheral processing devices 120, 130, 140, the two associated physical ports, and the switch device 110 can define a virtual link that connects the two virtual ports. For example, the virtual ports 194 and 152 instantiated at the peripheral processing device 120, the physical ports 128 and 125 of the peripheral processing device 120, and the switch device 110 (via the ports 115 and 112) can define a virtual link that connects the virtual ports 194 and 152. For another example, the virtual ports 162 and 174 instantiated at the peripheral processing devices 120 and 130, respectively, the physical port 125 of the peripheral processing device 120 and the physical port 135 of the peripheral processing device and 130, and the switch device 110 (via the ports 112 and 113) can define another virtual link that connects the virtual ports 162 and 174.

Such a virtual link can provide a secure point-to-point connection between the two virtual ports via the two physical ports and the switch device 110. As a result, a communication session can be established between the two virtual ports, such that data traffic (e.g., Fibre Channel data traffic, traffic having Fibre Channel data units) can be transmitted, in a VN2VN mode, between the two virtual ports via the physical ports and the switch device 110. For example, the virtual port 172 instantiated at the peripheral processing device 120 is configured to send FCoE data frames to the port 112 of the switch device 110 via the physical port 125. In response to receiving the FCoE data frames, the switch device 110 is configured to forward (based on information associated with the received data, as described in detail with respect to FIGS. 2 and 3) via the port 113 the FCoE data frames to the physical port 135 of the peripheral processing device 130, which is then configured to send the FCoE frames to the virtual port 154.

In some embodiments, each virtual link connecting two virtual ports can be uniquely identified by, for example, Media Access Control (MAC) addresses associated with the two virtual ports (e.g., MAC addresses of FCoE VN ports). Uniquely identifying each virtual link enables the logical separation of traffic that belongs to each virtual link. As a result, a single physical link between the two physical ports can carry multiple virtual links and maintain secure, separate transport of traffic on the different virtual links. For example, the physical link between the physical port 135 and the physical port 145 (via the switch device 110 including the ports 113, 114) can carry multiple virtual links between each of the virtual ports 154, 166, 174 instantiated at the peripheral processing device 130 and each of the virtual ports 156, 182, 192 instantiated at the peripheral processing device 140.

In some embodiments, with such an implementation of the VN2VN protocol, any number of virtual ports of the peripheral processing devices (e.g., the peripheral processing devices 120, 130, 140) operatively coupled to the switch device 110 can be allowed to communicate with one another virtual port of the peripheral processing devices in such a peer-to-peer communication without using any central-controlling device such as, for example, a FCF.

Figure 2:
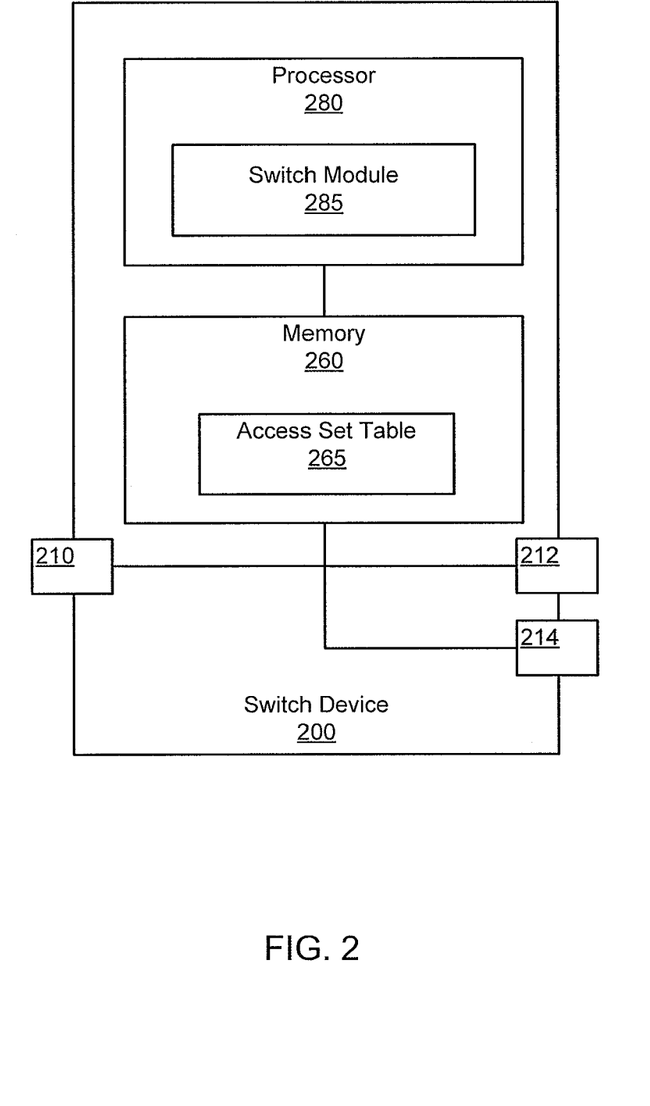
FIG. 2 is a block diagram of a switch device, according to an embodiment.

FIG. 2 is a block diagram of a switch device 200, according to an embodiment. The switch device 200 can be structurally and functionally similar to the switch device 110 shown and described with respect to FIG. 1. Particularly, the switch device 200 can be operatively coupled to one or more peripheral processing devices (e.g., server devices, storage devices, compute devices, etc.; not shown in FIG. 2) similar to the peripheral processing device 120, 130 or 140 shown and described with respect to FIG. 1. In some instances, the switch device 200 can be situated at the boundary of and operatively coupled to a switch fabric (e.g., a multi-stage switch fabric) that hosts the switch device 200, and coupled to other switching devices of the switch fabric. In such instances, the switch device 200 can connect the coupled peripheral processing device(s) to the remaining portion of the switch fabric (e.g., other switch devices of the switch fabric), and other peripheral processing devices operatively coupled to the switch fabric.

As shown in FIG. 2, the switch device 200 includes a processor 280, which includes a switch module 285; a memory 260, which includes an access set table 265; and ports 210, 212, 214. Each component, module or element of the switch device 200 is operatively coupled to each other component, module or element. As such, operations of the ports 210, 212 and 214 are controlled by the processor 280; data stored in the memory 260 (e.g., in the access set table 265) is maintained and updated under the control of the processor 280; and instructions stored in the memory 260 are executed by the processor 280. In some embodiments, the switch device 200 can also include other components, modules, or elements that are not shown in FIG. 2, such as, for example, a communication module, a NIC, a power supply, etc.

The ports 210, 212 and 214 can be structurally and functionally similar to the ports 112-115 of the switch device 110 shown and described with respect to FIG. 1. In some embodiments, each port 210, 212, 214 can be included in a line card (e.g., an Ethernet NIC). In some embodiments, each port 210, 212, 214 can be operatively or physically coupled to a peripheral processing device or another network entity (e.g., another switch device) via, for example, an electrical connection, an optical fiber connection, a wireless connection, and/or any other suitable means of connection. In such embodiments, the port 210, 212, 214 can be a port with the appropriate hardware and/or software (stored in memory and/or executing in hardware) configuration that is enabled to handle transmitting data over the specific means of connection.

In some embodiments, the port 210, 212, 214 can function as an ingress port and/or an egress port for the switch device 200. That is, the switch device 200 can be configured to receive data units (e.g., Fibre Channel data units) from and/or send data units to a peripheral processing device or any other network entity (e.g., another switch device) via the port 210, 212, 214. Furthermore, in some embodiments, the port 210, 212, 214 can be a physical Ethernet port configured to exchange data with the connected peripheral processing device or any other device based on the Ethernet and/or FCoE network protocols. For example, the switch device 200 can receive FCoE data frames from and send FCoE data frames to, via the port 210, a peripheral processing device connected to the port 210. For another example, the switch device 200 can receive FCoE data units from and send FCoE data units to, via the port 212, another switch device connected to the port 212 that is within the switch fabric that hosts the switch device 200.

The processor 280 can be any processing device or component configured to perform the data switching function and/or other associated functions for the switch device 200. In some embodiments, the switch module 285 as well as other one or more modules (not shown in FIG. 2) of the processor 280 can perform different functions associated with the data switching. In such embodiments, the module(s) included in the processor 280 can be a hardware-based module (e.g., an Application-Specific Integrated Circuit (ASIC), a Digital Signal Processor (DSP), a Field-Programmable Gate Array (FPGA), etc.), a software-based module (e.g., a module of computer code executed at a processor, a set of processor-readable instructions executed at a processor), and/or a combination of hardware- and software-based modules. In some embodiments, the module(s) included and executed in the processor 280 can be, for example, a process, application, virtual machine, and/or some other hardware or software module (stored in memory and/or executing in hardware).

Particularly, the switch module 285 can be configured to perform network switching functions on data units (e.g., Fibre Channel data packets, frames, cells) received at the switch device 200. For example, the switch module 285 can send a received Fibre Channel data frame to an appropriate peripheral processing device (not shown in FIG. 2) via a port (e.g., the port 210) of the switch device 200 that is coupled to that peripheral processing device. For another example, the switch module 285 can send a received Fibre Channel data frame to an appropriate next-hop device (e.g., a switch device at a second stage of the multi-stage switch fabric that hosts the switch device 200) via a port (e.g., the port 212) of the switch device 200 that is coupled to that next-hop device. In some embodiments, the switch module 285 can be configured to send data originated from a virtual port of a peripheral processing device (e.g., the virtual port 194 of the peripheral processing device 120 in FIG. 1) to an appropriate next-hop device via a port of the switch device 200, such that the data can be forwarded to a destined virtual port of the same or another peripheral processing device (e.g., the virtual port 162 of the peripheral processing device 120 in FIG. 1, the virtual port 166 of the peripheral processing device 130 in FIG. 1). Thus, the switch device 200 can implement the VN2VN protocol and enable communications between virtual ports of peripheral processing devices.

In some embodiments, the memory 260 can be, for example, a Random-Access Memory (RAM) (e.g., a dynamic RAM, a static RAM), a flash memory, a removable memory, and/or so forth. In some embodiments, instructions that implement the access set table 265 can be stored within the memory 260 and executed at the processor 280. In some embodiments, the access set table 265 can be implemented as, for example, a relational database, a table, and/or so forth. In some embodiments, although not shown in FIG. 2, more than one access set table and/or other types of data structures associated with performing data switching can be stored in the memory 260.

Figure 3:
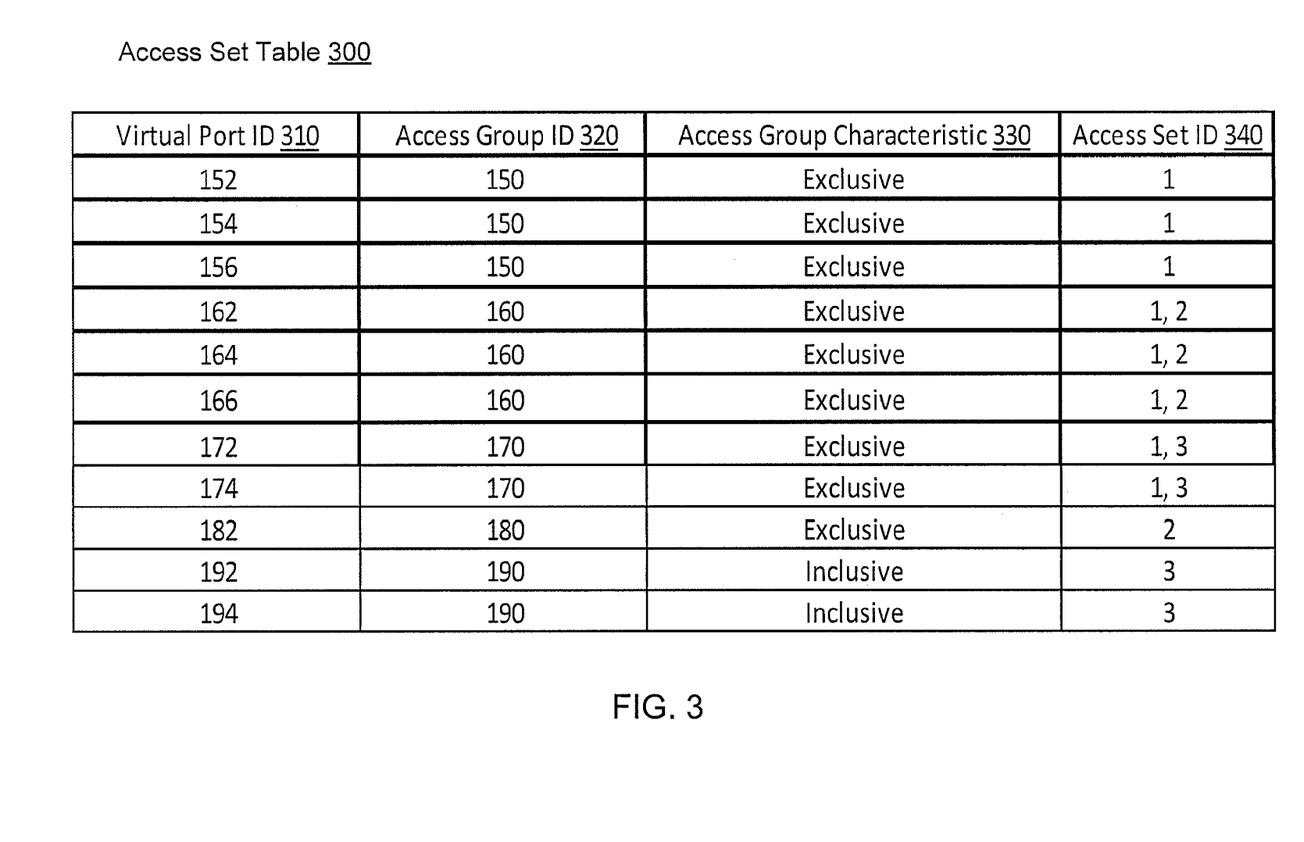
FIG. 3 is a schematic illustration of an access set table implemented at a switch device, according to an embodiment.

FIG. 3 is a schematic illustration of an access set table 300 implemented at a service device, according to an embodiment. The access set table 300 can be similar to the access set table 265 in FIG. 2, and the switch device hosting the access set table 300 can be similar to the switch device 110 and the switch device 200 shown and described with respect to FIGS.

1 and 2, respectively. Particularly, for example, the access set table 300 can be implemented at the switch device 110 in FIG. 1, such that the switch device 110 can performing data switching for data units received from and sent to the coupled peripheral processing devices (e.g., the peripheral processing devices 120, 130, 140) based on the access set table 300, as described in detail below.

As shown in FIG. 3, the access set table 300 has four columns of entries, shown as virtual port ID (in column 310), access group ID (in column 320), access group characteristic (in column 330), and access set ID (in column 340). The first column of the access set table 300, column 310, contains identifiers of virtual ports (e.g., 152, 154, 156, 162, 164, 166, 172, 174, 182, 192, 194), each of which uniquely identifies a virtual port operatively coupled to a port of the switch device (e.g., the switch device 110) that hosts the access set table 300.

The second column of the access set table 300, column 320, contains identifiers of access groups (e.g., 150, 160, 170, 180, 190), each of which uniquely identifies an access group associated with the virtual port identified in the first column of the same entry. Specifically, each virtual port is included in one and only one access group. In the example of FIGS. 1 and 3, the virtual ports 152, 154 and 156 are included in the access group 150; the virtual ports 162, 164 and 166 are included in the access group 160; the virtual ports 172 and 174 are included in the access group 170; the virtual port 182 is included in the access group 180; the virtual ports 192 and 194 are included in the access group 190. Furthermore, each access group is associated with (e.g., included in) an access set. Unlike a virtual port being included in a single access group, an access group can be associated with multiple access sets. In some instances, an access group is within context of a VLAN. That is, virtual ports included in the access group are associated with a common VLAN. In some embodiments, an access set is within context of a layer-2 (i.e., the data link layer of the Open Systems Interconnection (OSI) model, or the link layer of the Transmission Control Protocol (TCP)/Internet Protocol (IP) reference model) domain. That is, access groups associated with the access set are defined within the layer-2 domain.

The third column of the access set table 300, column 330, contains information of a group characteristic of the access group (e.g., exclusive, inclusive) identified in the second column of the same entry. Specifically, each access group is identified as an exclusive access group or an inclusive access group. A virtual port included in an exclusive access group associated with an access set is allowed to communicate with (e.g., transmit data to) a virtual port included in another access group associated with the same access set. Similarly, a virtual port included in an inclusive access group associated with an access set is allowed to communicate with (e.g., transmit data to) a virtual port included in another access group associated with the same access set. On the other hand, a virtual port included in an exclusive access group associated with an access set is not allowed to communicate with (e.g., transmit data to) another virtual port included in the same access group, or a virtual port included in an access group associated with another access set. Similar to the scenario of an exclusive access group, a virtual port included in an inclusive access group associated with an access set is not allowed to communicate with (e.g., transmit data to) a virtual port included in an access group associated with another access set. As indicated in FIG. 3, the access groups 150, 160, 170 and 180 are exclusive access groups, and the access group 190 is an inclusive access group.

The fourth column of the access set table 300, column 340, contains identifiers of access sets (e.g., 1, 2, 3) for access sets, each of which uniquely identifies an access set that is associated with the access group identified in the second column of the same entry. Specifically, as indicated in FIG. 3, the access group 150 is associated with the access set 1; the access group 160 is associated with the access sets 1 and 2; the access group 170 is associated with the access sets 1 and 3; the access group 180 is associated with the access set 2; the access group 190 is associated with the access set 3.

Returning to FIG. 1, an access set table such as the access set table 300 in FIG. 3 can be implemented at the switch device 110 (e.g., in a memory of the switch device 110). In some instances, for example, information stored in such an access set table can be entered by a network administrator (e.g., an administrator of a SAN) that operates the switch device 110. In other instances, the information can be generated at the switch device 110 based on data units and/or information collected from the peripheral processing devices 120, 130, 140. In some instances, more than one data structure similar to the access set table 300 can be implemented at the switch device 110.

In the example of FIGS. 1 and 3, the switch device 110 can be configured to perform data switching for data received from the peripheral processing devices 120, 130, 140 based on filter rules defined in the access set table 300. Initially, a source virtual port instantiated at a peripheral processing device can be configured to send a data unit to a port of the switch device 110 via a physical port. The data unit can be addressed to a destination virtual port instantiated at the same peripheral processing device or another peripheral processing device. For example, the virtual port 152 sends a data unit (e.g., a FCoE frame), which is addressed to the virtual port 164, to the port 112 of the switch device 110 via the physical port 125; the virtual port 154 sends a data unit, which is addressed to the virtual port 156, to the port 113 of the switch device 110 via the physical port 135; the virtual port 172 sends a data unit, which is addressed to the virtual port 182, to the port 112 of the switch device 110 via the physical port 125; the virtual port 194 sends a data unit, which is addressed to the virtual port 174, to the port 115 of the switch device 110 via the physical port 128; the virtual port 192 sends a data unit, which is addressed to the virtual port 194, to the port 114 of the switch device 110 via the physical port 145.

In response to receiving such a data unit, a switch module of the switch device 110 (e.g., the switch module 285 of the switch device 200 in FIG. 2) can determine an entry from the access set table 300 that is associated with the source virtual port based on the identifier of the source virtual port. Similarly, the switch module of the switch device 110 can determine an entry from the access set table 300 that is associated with the destination virtual port based on the identifier of the destination virtual port. For example, the switch module of the switch device 110 determines, based on the identifiers of the source virtual ports and the destination virtual ports that are included in the received data unit, an entry for the virtual port 152, 154, 156, 164, 172, 174, 182, 192, and 194, in the access set table 300.

Based on information stored in the entries of the source virtual port and the destination virtual port, the switch module can be configured to determine a filter rule for the received data unit. That is, the switch module can be configured to determine whether the data unit should be forwarded to the destination virtual port based on: 1) whether the source virtual port and the destination virtual port are included in the same access group; 2) if the source virtual port and the destination virtual are included in different access groups, whether those two access groups are associated with a common access set; and 3) if the source virtual port and the destination virtual are included in the same access group, whether the group characteristic of that access group is exclusive or inclusive.

For example, based on the information from the entries of the access set table 300, the switch module determines that: 1) the virtual port 152 is allowed to send data to the virtual port 164 because these two virtual ports are included, respectively, in two different access groups (i.e., the access groups 150 and 160) that are associated with a common access set (i.e., the access set 1); 2) the virtual port 154 is prohibited from sending data to the virtual port 156 because these two virtual ports are included in the same access group (i.e., the access group 150) that is an exclusive access group; 3) the virtual port 172 is prohibited from sending data to the virtual port 182 because these two virtual ports are included, respectively, in two different access groups (i.e., the access groups 170 and 180) that are not associated with a common access set (i.e., the access group 170 is associated with the access sets 1 and 3, the access group 180 is associated with the access set 2); 4) the virtual port 194 is allowed to send data to the virtual port 174 because these two virtual ports are included, respectively, in two different access groups (i.e., the access groups 190 and 170) that are associated with a common access set (i.e., the access set 3); 5) the virtual port 192 is allowed to send data to the virtual port 194 because these two virtual ports are included in the same access group (i.e., the access group 190) that is an inclusive access group.

Based on the filter rule, the switch module of the switch device 110 can be configured to forward the data unit to the destination virtual port if the filter rule allows data transmission from the source virtual port to the destination virtual port, or drop the data unit if the filter rule prohibits such data transmission. Following the above examples, the switch module of the switch device 110 forwards the corresponding data units to the virtual port 164, the virtual port 174 and the virtual port 194, respectively; and drops the corresponding data units that are addressed to the virtual ports 156 and 182, respectively.

FIG. 4 is a schematic illustration of a switch fabric 400 configured to switch data for a set of peripheral processing devices 412, 422, 424, 432, 442, 444, according to an embodiment. The switch fabric 400 includes a set of switch devices (e.g., the switch devices 410, 420, 430, 440) situated as edge devices at the boundary of the switch fabric 400, and/or other devices (e.g., switching devices, networking devices) included in a network portion 470 that are configured to connect the switch devices. As shown in FIG. 4, each switch device 410, 420, 430, 440 is operatively coupled to one or multiple peripheral processing devices 412, 422, 424, 432, 432, 444.

The peripheral processing devices shown in FIG. 4 can be structurally and functionally similar to the peripheral processing devices 120, 130, 140 shown and described with respect to FIG. 1. Specifically, the peripheral processing devices 412, 422, 424, 432, 432, 444 can be, for example, a server device, a storage device, a computing device, a routing device, and/or the like. The switch devices 410, 420, 430, 440 can be structurally and functionally similar to the switch device 110 and the switch device 200 shown and described with respect to FIGS. 1 and 2. In some embodiments, each switch device 410, 420, 430, 440 can function as an ingress switch and/or egress switch for the switch fabric 400, which operatively couples the corresponding peripheral processing device(s) to the switch fabric 400. Particularly, as shown in FIG. 4, a switch device can be connected to and function as an ingress switch and/or egress switch for more than one peripheral processing device. In some embodiments, the switch fabric 400 can include any number of switch devices, each of which can couple any number of peripheral processing devices to the switch fabric 400.

The network portion 470 can be any combination of networking devices configured to operatively couple the switch devices (e.g., the switch devices 410, 420, 430, 440) situated at the boundary of the switch fabric 400 to each other. Similarly stated, the network portion 470 can include a combination of hardware and/or software (stored in memory and/or executing on hardware) configured to transmit data between the peripheral processing devices via the switch devices. In some embodiments, the network portion 470 can be, for example, a portion of a data center fabric, local area network (LAN), wide area network (WAN), storage area network (SAN), intranet, Internet, and/or the like. In some embodiments, the network portion 470 can be, for example, a mixed Ethernet and Fibre Channel portion of a network. In such embodiments, the network portion 470 can include, for example, one or more Ethernet and Fibre Channel-compatible routers, line cards, NICs, and/or the like. Furthermore, in some embodiments, the switch fabric 400 can be or include a multi-stage switch fabric.

In some embodiments, similar to the switch device 110 as described with respect to FIG. 1, the switch fabric 400, including the coupled peripheral processing devices, can operate as a SAN such as a pNFS. In such embodiments, for example, a set of the peripheral processing devices (e.g., the peripheral processing devices 412, 432) can be server devices and another set of the peripheral processing devices (e.g., the peripheral processing devices 422, 424, 442, 444) can be storage devices. The server devices can access data stored in the storage devices. A server device may or may not access another server device depending on an access control policy implemented at the switch devices 410, 420, 430, 440. Similarly, a storage device may or may not access another storage device according to the access control policy implemented at the switch devices 410, 420, 430, 440. Such an access control mechanism can be implemented at the switch devices 410, 420, 430, 440 in a method similar to the filtering operation described above with respect to FIGS. 1 and 3.

In some implementations, similarly as described above with respect to FIGS. 1 and 3, a filtering operation can be performed at an ingress switch device with respect to a data unit switched within the switch fabric 400. For example, when a virtual port instantiated at the peripheral processing device 422 sends to the switch device 420 a data unit addressed to a virtual port instantiated at the peripheral processing device 442, the switch device 420 filters the data unit before the switch device 420 determines whether to forward the data unit to the switch device 440. In some other implementations, such a filtering operation can be performed at an egress switch device with respect to a data unit switched with the switch fabric 400. In the example above, the switch device 420 can forward the data unit to the switch device 440 without performing the filtering operation on the data unit, and the switch device 440 can filter the data unit to determine whether to forward the data unit to the peripheral processing device 442. In some embodiments, such a filtering operation can be performed at both an ingress switch device and an egress switch device with respect to a data unit switched within the switch fabric 400.

In some embodiments, the switch fabric 400 functions within a layer-2 domain. That is, network entities (e.g., switch devices) included in the switch fabric 400 are substantially layer-2 network devices configured to transmit data between network entities on the same local area network segment (i.e., layer-2 network segment). For example, the network portion 470 can be an Ethernet network or a portion of an Ethernet network, where devices in the network portion 470 are enabled to transmit Fibre Channel frames and/or packets within a local area network segment of the Ethernet network. In some implementations, a layer-2 domain can be subdivided into multiple access sets and/or access groups. In some other implementations, the switch fabric can include layer-3 (i.e., the network layer of the OSI model, or the Internet Protocol (IP) layer of the TCP/IP reference model) devices enabled to transmit data across multiple layer-3 domains (i.e., multiple local area network segments).

Figure 5:
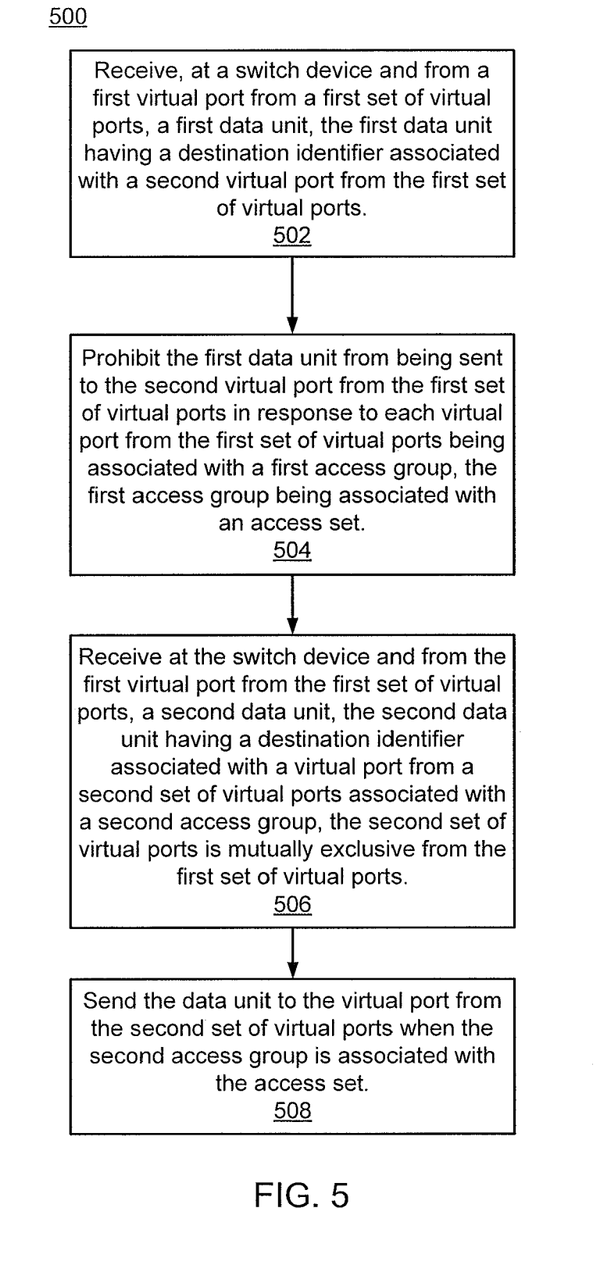
FIG. 5 is a flow chart illustrating a method of switching data units at a switch device, according to an embodiment.

FIG. 5 is a flow chart illustrating a method 500 of switching data units at a switch device, according to an embodiment. The switch device can be structurally and functionally similar to the switch device 110 and the switch device 200 shown and described with respect to FIGS. 1 and 2. The switch device can be operated as a single switching device (similar to the switch device 110 in FIG. 1) or included in a switch fabric (e.g., a multi-stage switch fabric) similar to the switch fabric 400 shown and described with respect to FIG. 4. The code representing instructions to perform the method 500 can be stored in, for example, a non-transitory processor-readable medium in the switch device (e.g., a memory similar to the memory 260 of the switch device 200 in FIG. 2). The code can be executed by, for example, a processor of the switch device (e.g., the processor 280 of the switch device 200 in FIG. 2). The code stored in the non-transitory processor-readable medium includes code to be executed by the processor to cause the switch device to operate the functions illustrated in FIG. 5 and described as follows.

At 502, the switch device receives a first data unit from a first virtual port from a first set of virtual ports. The first data unit has a destination identifier associated with a second virtual port from the first set of virtual ports. In the example of FIGS. 1 and 3, the port 112 of the switch device 110 receives a first data unit (e.g., a FCoE frame) sent from the virtual port 162 instantiated at the peripheral processing device 120. The first data unit is addressed to the virtual port 166 instantiated at the peripheral processing device 130. Both the virtual port 162 and the virtual port 166 are included in the access group 160, which is associated with the access set 1 and the access set 2.

At 504, the switch device prohibits the first data unit from being sent to the second virtual port in response to each virtual port from the first set of virtual ports being associated with a first access group. The first access group is associated with an access set. In the example of FIGS. 1 and 3, in response to receiving the first data unit, a switch module of the switch device (e.g., the switch module 285 of the switch device 200 in FIG. 2) determines a filter rule associated with sending data from the virtual port 162 to the virtual port 166 from the access set table 300 that is implemented at the switch device 110. Specifically, based on the information associated with the virtual ports 162 and 166 stored in the access set table 300, the switch module determines that the virtual port 162 is prohibited from sending data to the virtual port 166 because these two virtual ports are both included in an access group (access group 160) that is an exclusive group. As a result, the switch device 110 drops the first data unit.

At 506, the switch device receives a second data unit from the first virtual port. The second data unit has a destination identifier associated with a virtual port from a second set of virtual ports associated with a second access group. The second set of virtual ports is mutually exclusive from the first set of virtual ports. In the example of FIGS. 1 and 3, the port 112 of the switch device 110 receives a second data unit (e.g., a FCoE frame) sent from the virtual port 162 instantiated at the peripheral processing device 120. The second data unit is addressed to the virtual port 174 instantiated at the peripheral processing device 130. The virtual port 174 is included in the access group 170, which is associated with the access sets 1 and 3.

At 508, the switch device sends the second data unit to the virtual port from the second set of virtual ports when the second access group is associated with the access set. In the example of FIGS. 1 and 3, similar to the step 504 described above, in response to receiving the second data unit, the switch module of the switch device determines a filter rule associated with sending data from the virtual port 162 to the virtual port 174 from the access set table 300. Specifically, based on the information associated with the virtual ports 162 and 174 stored in the access set table 300, the switch module determines that the virtual port 162 is allowed to send data to the virtual port 174 because these two virtual ports are included in two different access groups (i.e., the access groups 160 and 170), respectively, which are both associated with a common access set (access set 1). As a result, the switch device 110 forwards the second data unit to the virtual port 174 via the port 113.

While various embodiments have been described above, it should be understood that they have been presented by way of example only, not limitation, and various changes in finial and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. An apparatus, comprising:
a switch device configured to receive a data unit from a virtual port from a first set of virtual ports, the switch device configured to associate an identifier of each virtual port from the first set of virtual ports with an identifier of a first access group, the first access group associated with an access set,
the switch device configured to prohibit the data unit from being sent to a remaining virtual port from the first set of virtual ports if the data unit is addressed to the remaining virtual port from the first set of virtual ports, the switch device configured to allow the data unit to be sent to a virtual port from a second set of virtual ports associated with a second access group when the second access group is associated with the access set if the data unit is addressed to the virtual port from the second set of virtual ports, the second set of virtual ports is mutually exclusive from the first set of virtual ports.

2. The apparatus of claim 1, wherein each virtual port from the first set of virtual ports is a Fibre Channel over Ethernet (FCoE) Virtual Node (VN) port implemented in a VN port to VN port (VN2VN) FCoE configuration.

3. The apparatus of claim 1, wherein each virtual port from the first set of virtual ports is a Fibre Channel over Ethernet (FCoE) virtual Node (VN) port.

4. The apparatus of claim 1, wherein the switch device is an edge device of a multi-stage switch.

5. The apparatus of claim 1, wherein the switch device is configured to prohibit the data unit from being sent to a remaining virtual port from the first set of virtual ports based on the first access group being restricted.

6. The apparatus of claim 1, wherein the identifier of the virtual port from the first set of virtual ports includes (1) an identifier associated with a physical port of a peripheral processing device associated with the virtual port from the first set of virtual ports and (2) a Virtual Local Area Network (VLAN) identifier associated with the virtual port from the first set of virtual ports.

7. The apparatus of claim 1, wherein the switch device is configured to be operatively coupled to a physical port on a peripheral processing device associated with the virtual port from the first set of virtual ports.

8. The apparatus of claim 1, wherein the data unit is a first data unit, the first data unit is a unicast frame, the switch device configured to allow a second data unit to be sent to a remaining virtual port from the first set of virtual ports based on the second data unit being a multicast frame.

9. The apparatus of claim 1, wherein the first access group is associated with a Layer 2 (L2) domain, the second access group is associated with the L2 domain.

10. A non-transitory processor-readable medium storing code representing instructions to be executed by a processor, the code comprising code to cause the processor to:
receive, at a switch device and from a first virtual port from a first set of virtual ports, a first data unit, the first data unit having a destination identifier associated with a second virtual port from the first set of virtual ports;
prohibit the first data unit from being sent to the second virtual port from the first set of virtual ports in response to each virtual port from the first set of virtual ports being associated with a first access group, the first access group being associated with an access set;
receive at the switch device and from the first virtual port from the first set of virtual ports, a second data unit, the second data unit having a destination identifier associated with a virtual port from a second set of virtual ports associated with a second access group, the second set of virtual ports is mutually exclusive from the first set of virtual ports; and
send the second data unit to the virtual port from the second set of virtual ports when the second access group is associated with the access set.

11. The non-transitory processor-readable medium of claim 10, wherein the first virtual port is a Fibre Channel over Ethernet (FCoE) Virtual Node (VN) port implemented in a VN port to VN port (VN2VN) FCoE configuration.

12. The non-transitory processor-readable medium of claim 10, wherein the switch device is an edge device of a multi-stage switch.

13. The non-transitory processor-readable medium of claim 10, wherein the code to cause the processor to receive the first data unit includes code to cause the processor to receive the first data unit from the first virtual port via a physical port of a peripheral processing device operatively coupled to the switch device.

14. The non-transitory processor-readable medium of claim 10, wherein the first access group is associated with a Layer 2 (L2) domain, the second access group is associated with the L2 domain.

15. An apparatus, comprising:
a switch module implemented in a memory or a processing device, the switch module configured to be operatively coupled to a plurality of virtual ports; and
an access set table accessible to the switch module, the access set table configured to associate an identifier of each virtual port from the plurality of virtual ports with an identifier of an access group from a plurality of access groups, the access set table configured to associate an identifier of each access group from the plurality of access groups with an identifier of at least one access set, the switch module configured to implement a plurality of filter rules based on the access set table, the plurality of virtual ports including a first virtual port that is associated with a first access group (1) from the plurality of access groups and (2) associated with an access set from the at least one access set, the plurality of virtual ports including a second virtual port associated with a second access group from the plurality of access groups,
the switch module configured to prohibit a first data unit received from the first virtual port from being sent to a third virtual port from the plurality of virtual ports based on a first filter rule (1) from the plurality of filter rules and (2) indicating that the third virtual port is associated with the first access group,
the switch module configured to allow a second data unit received from the first virtual port to be sent to the second virtual port based on a second filter rule (1) from the plurality of filter rules and (2) indicating that the second access group is associated with the access set from the at least one access set.

16. The apparatus of claim 15, wherein the identifier of the first virtual port includes (1) an identifier associated with a physical port of a peripheral processing device associated with the first virtual port and (2) a Virtual Local Area Network (VLAN) identifier associated with the first virtual port.

17. The apparatus of claim 15, wherein each virtual port from the plurality of virtual ports is a Fibre Channel over Ethernet (FCoE) Virtual Node (VN) port implemented in a VN port to VN port (VN2VN) FCoE configuration.

18. The apparatus of claim 15, wherein the switch module is within an edge device of a multi-stage switch.

19. The apparatus of claim 15, wherein the switch module is configured to prohibit the data unit from being sent to the third virtual port based on the first access group being restricted.

20. The apparatus of claim 15, wherein the first data unit is a unicast frame, the switch module configured to allow a third data unit received from the first virtual port to be sent to the third virtual port based on the third data unit being a multicast frame.

* * * * *